(12) United States Patent
Tsukamoto

(10) Patent No.: US 10,457,229 B2
(45) Date of Patent: Oct. 29, 2019

(54) BRANCH STRUCTURE AND WIRE HARNESS

(71) Applicant: Yazaki Corporation, Tokyo (JP)

(72) Inventor: Masashi Tsukamoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/791,920

(22) Filed: Oct. 24, 2017

(65) Prior Publication Data

US 2018/0118137 A1    May 3, 2018

(30) Foreign Application Priority Data

Oct. 27, 2016 (JP) ................. 2016-210508

(51) Int. Cl.
| | |
|---|---|
| *B60R 16/02* | (2006.01) |
| *H01R 25/14* | (2006.01) |
| *H02G 3/08* | (2006.01) |
| *H02G 5/00* | (2006.01) |
| *H01R 12/51* | (2011.01) |
| *H02G 3/16* | (2006.01) |
| *H02G 3/32* | (2006.01) |

(52) U.S. Cl.
CPC ....... *B60R 16/0215* (2013.01); *H01R 12/515* (2013.01); *H01R 25/145* (2013.01); *H02G 3/08* (2013.01); *H02G 5/00* (2013.01); *H02G 3/16* (2013.01); *H02G 3/32* (2013.01)

(58) Field of Classification Search
CPC .................................. B60R 16/0215
USPC ........................................ 174/520
See application file for complete search history.

(56) References Cited

U.S. PATENT DOCUMENTS

| | | | | | |
|---|---|---|---|---|---|
| 4,261,629 | A | * | 4/1981 | Reynolds | H01R 4/2462 439/399 |
| 5,808,260 | A | * | 9/1998 | Asakura | H01R 4/187 219/56.22 |
| 2014/0103715 | A1 | * | 4/2014 | Ito | B60R 16/0207 307/24 |

(Continued)

FOREIGN PATENT DOCUMENTS

| | | |
|---|---|---|
| JP | 4-274943 A | 9/1992 |
| JP | 2015-227089 A | 12/2015 |
| JP | 2016-147558 A | 8/2016 |

OTHER PUBLICATIONS

Communication dated Nov. 27, 2018, issued by the Japanese Patent Office in counterpart Japanese Patent Application No. 2016-210508.

*Primary Examiner* — Stanley Tso
(74) *Attorney, Agent, or Firm* — Sughrue Mion, PLLC

(57) ABSTRACT

A branch structure includes a trunk-line harness in which a plurality of trunk lines including a routing member having a rod conductor are disposed in parallel, a branch-line harness that has a plurality of branch lines, and a connection terminal that electrically connects the branch line to the trunk line by being joined to the trunk line. The connection terminal includes a connection plate portion which has a width dimension smaller than the width of the trunk line, and is joined in a state of being in surface contact with an outer peripheral surface of the rod conductor in the trunk line, and the connection plate portion is joined to the trunk line at a position where the connection plate portion is orthogonal to an arrangement direction of the trunk lines.

4 Claims, 12 Drawing Sheets

(56) References Cited

U.S. PATENT DOCUMENTS

2015/0349471 A1  12/2015  Maki et al.

* cited by examiner

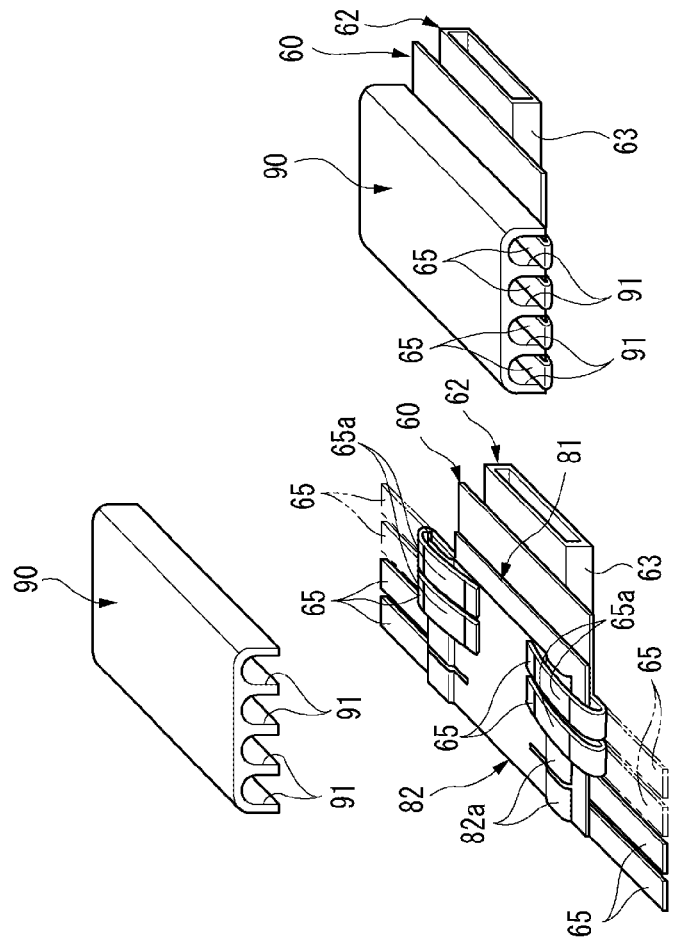
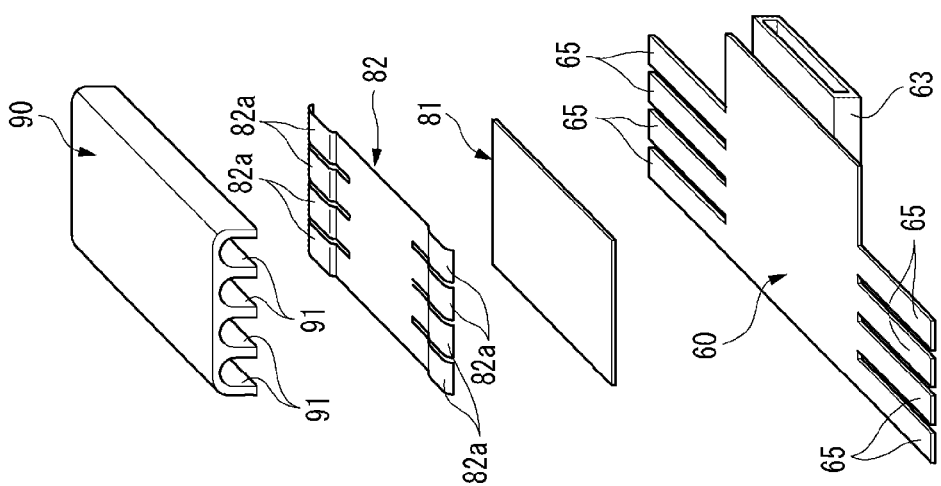
FIG. 8A  FIG. 8B  FIG. 8C

BRANCH STRUCTURE AND WIRE HARNESS

CROSS REFERENCE TO RELATED APPLICATION

This application is based on Japanese Patent Application No. 2016-210508 filed on Oct. 27, 2016, the contents of which are incorporated herein by reference.

BACKGROUND OF THE INVENTION

1. Technical Field

The present invention relates to a branch structure and a wire harness.

2. Background Art

For example, in a vehicle wire harness, a branch-line harness is connected to a trunk-line harness in which trunk lines such as a power supply system line and a ground line are integrated, and is connected to each electrical component.

As a technique of connecting the branch-line harness to the trunk-line harness and branching the branch-line harness, there is a technique for press-contacting the trunk line of the trunk-line harness against a pressure-contact terminal of a branching mechanism and connecting to the branch line, using the branching mechanism having the pressure-contact terminal (e.g., see JP-A-2015-227089).

In the branching mechanism provided with the pressure-contact terminal, since the trunk lines are pushed to come into pressure-contact between a pair of pressure-contact blades, the pressure-contact blades are disposed on both sides of the trunk line. Therefore, when the branch-line harness is branched using the pressure-contact terminal, the interval between the trunk lines of the trunk-line harnesses arranged in parallel increases and the occupied space increases.

Further, in the branch structure using the pressure-contact terminal, since the electric wires are pushed and brought into contact with each other between the pressure-contact blades, there is a risk of a decline in the connection reliability due to the insufficiency of the contact area in the trunk line such as the electric power line through which a large current flows.

Further, in recent years, a rigid body line made of an aluminum single line is used as a trunk line of a trunk-line harness of a vehicle wire harness for the purpose of weight reduction and handling improvement. However, since the pressure-contact blades of the pressure-contact terminal are hard to cut into the single line that is a rigid body line, there is a desire for a branch structure that replaces a branch structure using a branching mechanism with a pressure-contact terminal.

The present invention has been made in view of the above circumstances, and an object of the present invention is to provide a branch structure and a wire harness capable of ensuring high connection reliability while saving space.

SUMMARY OF INVENTION

In order to achieve the above object, a branch structure and a wire harness according to the present invention are characterized by the following (1) to (4).

(1) According to an aspect of the invention, a branch structure includes:

a trunk-line harness in which a plurality of trunk lines including a routing member having a rod conductor are disposed in parallel;

a branch-line harness that has a plurality of branch lines; and a connection terminal that electrically connects the branch line to the trunk line by being joined to the trunk line, wherein the connection terminal includes a connection plate portion which has a width dimension smaller than the width of the trunk line, and is joined in a state of being in surface contact with an outer peripheral surface of the rod conductor in the trunk line, and the connection plate portion is joined to the trunk line at a position where the the connection plate portion is orthogonal to an arrangement direction of the trunk lines.

(2) In the branch structure (1), the connection terminal is mounted on a circuit board which is disposed along the arrangement direction of the trunk lines, and the connection terminal and the branch line are electrically connected to each other, by joining a connector of the branch-line harness to a connector provided on the circuit board.

(3) in the branch structure of (1), the connection terminal has a bus bar portion which extends along the arrangement direction of the trunk line from the connection plate portion, and the connection terminal and the branch line are electrically connected to each other, by joining a connector of the branch-line harness to a connector provided at an end portion of the bus bar portion.

(4) According to another aspect of the invention, a wire harness includes:

a trunk-line harness that is routed on a vehicle body including at least a power supply system line having a predetermined current capacity;

a branch-line harness that is connected to an auxiliary machinery of a vehicle; and a plurality of control boxes that have a control unit for distributing power of the power supply system line supplied to the trunk-line harness to the branch-line harness connected to the trunk-line harness, and are distributed and arranged along the trunk-line harness, wherein the control box connects the branch-line harness to the trunk-line harness with any one of the branch structure of (1) to (3).

According to the branch structure of the above configuration (1), the connection plate portion of the connection terminal for electrically connecting the branch line to the trunk line has a width dimension smaller than the width of the trunk line having the round rod conductor and is joined to the trunk line at a position orthogonal to the arrangement direction of the trunk lines. Accordingly, the connection terminal for connecting the branch line to the trunk line does not protrude in the arrangement direction of the power supply system line. Therefore, the interval between the trunk lines can be reduced as much as possible, and the space for the branching points can be saved.

Further, since the connection plate portion of the connection terminal is joined to the outer peripheral surface of the rod conductor in the trunk line in a state of surface contact, a large contact area can be secured and high connection reliability can be secured.

According to the branch structure of the above configuration (2), since the connection terminal joined to the trunk line and the branch line can be electrically connected to each other through the conductor pattern of the circuit board arranged along the arrangement direction of the trunk lines, the connection terminal can be made common and the shape can be simplified, and cost can be suppressed accordingly.

According to the branch structure of the above configuration (3), by providing the bus bar portion extending from the connection plate portion at the connection terminal, the connection terminal joined to the trunk line and the branch line can be electrically connected to each other without using the circuit board. As a result, the cost can be reduced by reducing the number of components.

According to the wire harness of the above configuration (4), by the trunk-line harness having at least the power supply system line having the predetermined current capacity and routed in the vehicle body, and the branch-line harness connecting the auxiliary machinery to the trunk-line harness via the plurality of control boxes distributed and arranged along the trunk-line harness, the wire harness having a simple structure can be configured, and it is possible to provide the wire harness in which the space saving at the connecting point of the branch-line harness to the trunk-line harness and the high connection reliability are obtained.

According to the present invention, it is possible to provide a branch structure and a wire harness that can secure high connection reliability while saving space.

The present invention has been briefly described above. Furthermore, the details of the present invention will be further clarified by reading through a mode for carrying out the invention (hereinafter referred to as "embodiment") described below with reference to the attached drawings.

BRIEF DESCRIPTION OF DRAWINGS

FIGS. 8A to 8C are views illustrating an assembly procedure of the branch box illustrated in FIG. 6, and are perspective views in respective processes;

DETAILED DESCRIPTION OF EMBODIMENTS

Hereinafter, an embodiment of the present invention will be described with reference to the drawings.

First, the configuration of a wire harness according to the present embodiment will be described.

Figure 1:
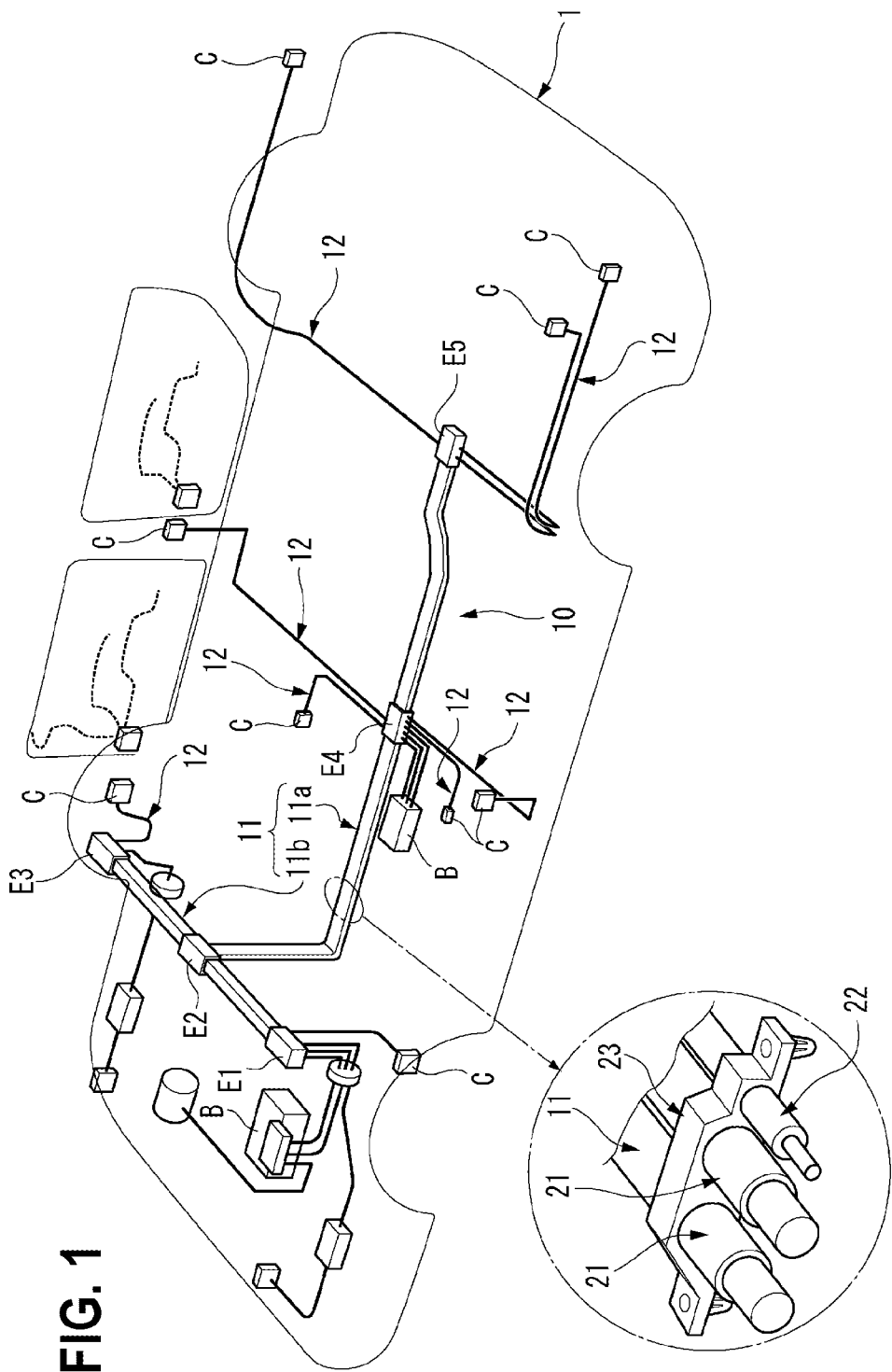
FIG. 1 is a schematic perspective view of a vehicle body on which a wire harness according to an embodiment of the present invention is routed.

FIG. 1 is a schematic perspective view of a vehicle body 1 on which a wire harness 10 according to the embodiment of the present invention is routed.

As illustrated in FIG. 1, the wire harness 10 is used as a power supply path for supplying electrical components as an auxiliary machinery of each part of the vehicle body 1 with power from a power supply B such as a main battery or a sub-battery mounted in the vehicle, respectively, or as a transmission path or the like necessary for transmitting and receiving signals to and from the electrical component.

The wire harness 10 includes a trunk-line harness 11 and a plurality of branch-line harnesses 12. The trunk-line harness 11, for example, is constituted as a routing member having a simple shape like a spine (backbone) in which a power supply system line 21 such as a power supply system line or a ground line with an insulating sheath 15 formed around a round rod conductor 13 as a rod conductor, and a communication line 22 formed of a plastic optical fiber are integrally held by a clamp 23 molded at predetermined intervals along the longitudinal direction. The round rod conductor 13 is a rod conductor made of a conductive metal material such as aluminum and is a rigid body formed of a round rod having a circular cross section. The round rod conductor 13 as a rigid body made of aluminum or an aluminum alloy has a high rigidity as compared to a stranded wire obtained by twisting a plurality of strands, and is lighter than copper wire or the like. The round rod conductor 13 formed of a round rod made of aluminum or an aluminum alloy is a routing member having a high degree of freedom in a routing path that can be bent in all directions. The communication line 22 is not limited to an optical fiber, but may be, for example, a stranded wire obtained by twisting strands made of copper or a copper alloy or the like.

The trunk-line harness 11 according to the present embodiment is roughly divided into a floor trunk-line harness 11a and an instrument panel trunk-line harness 11b.

The instrument panel trunk-line harness 11b is disposed linearly in the left-right direction so as to be substantially parallel to the reinforcement at a location along the surface of a dash panel (not illustrated).

In addition, the floor trunk-line harness 11a is disposed to extend in the front-rear direction of the vehicle body 1 at a substantially central portion in the left-right direction of the vehicle body 1 along the cabin floor, and extends linearly in the vertical direction at the location along the surface of the dash panel, and the distal end thereof is connected to the intermediate portion of the instrument panel trunk-line harness 11b. The connecting point between the instrument panel trunk-line harness 11b and the floor trunk-line harness 11a functions as a portion which electrically connects the instrument panel trunk-line harness 11b and the floor trunk-line harness 11a via a branching portion in a branch control box E2 which is a control box to be described later. That is, the trunk-line harness 11 is formed in a shape similar to a T shape by the instrument panel trunk-line harness 11b and the floor trunk-line harness 11a.

One end portion of the branch-line harness 12 according to the present embodiment is branched and connected to the trunk-line harness 11. A connector C is connected to the other end portion of the branch-line harness 12, and connectors of electrical components provided in various parts of the vehicle body 1 are connected to the connector C.

The trunk-line harness 11 has a control unit for distributing the power of the power supply system line 21 and the signal of the communication line 22 supplied to the trunk-line harness 11 to the branch-line harnesses 12 branched and connected to the trunk-line harness 11, and a plurality of control boxes (a supply side control box E1, a branch control box E2, an intermediate control box E3, and control boxes E4 and E5) distributed and arranged along the trunk-line harness 11 are provided. As a result, power is supplied from the power supply B, and the signal distribution from the control boxes E1 to E5 is performed on the electrical components of each part.

In the wire harness 10 described above, a branch control box E2 is provided at a connection point between the trunk-line harness 11 and the branch-line harness 12. The trunk-line harness 11 and the branch-line harness 12 are connected by the branch control box E2.

Next, the branch structure in each of the control boxes E1 to E5 will be described. Here, in order to facilitate the description of the branch structure according to the present embodiment, the branch structure of the branch box 100A which connects the four branch lines 71 of the branch-line harness 12 to the power supply system line 21, which is the four trunk lines arranged in parallel in the trunk-line harness 11, is described as an example, and the connection structure of the communication line 22 is omitted.

First Embodiment

Figure 2:
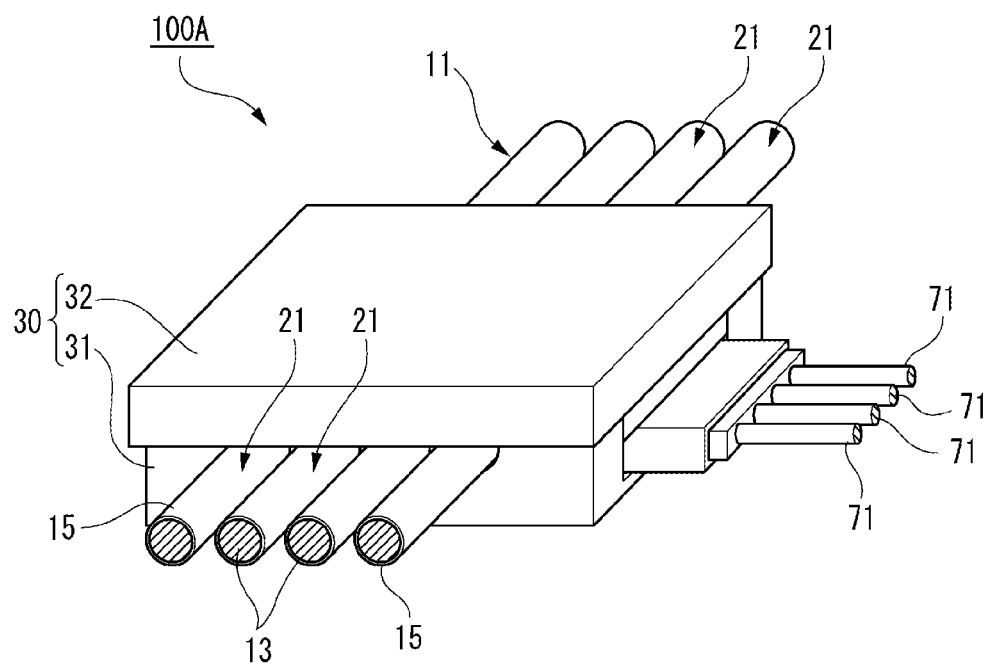
FIG. 2 is a perspective view of a branch box having a branch structure according to a first embodiment of the present invention.
Figure 3:
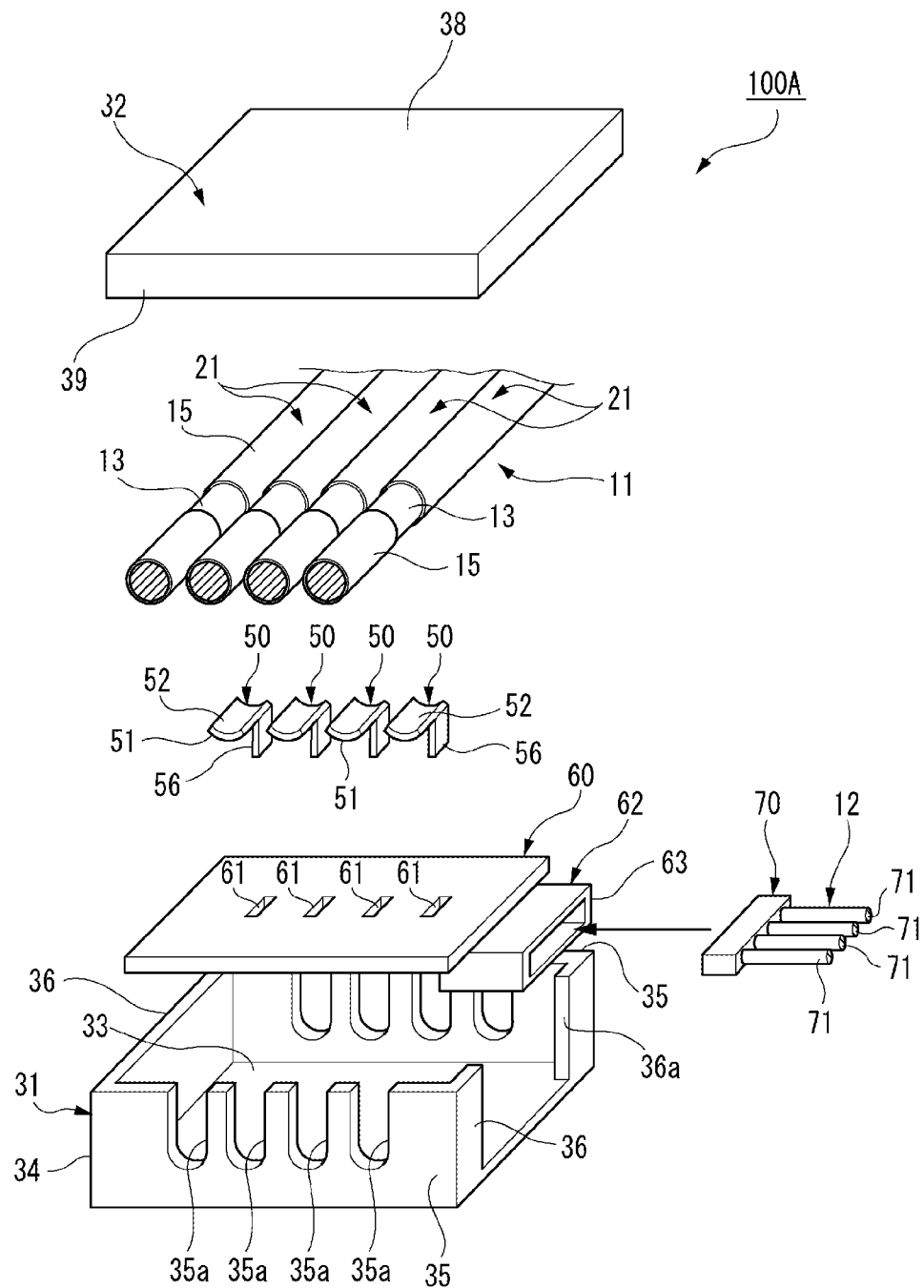
FIG. 3 is an exploded perspective view of the branch box illustrated in FIG. 2.
Figure 4:
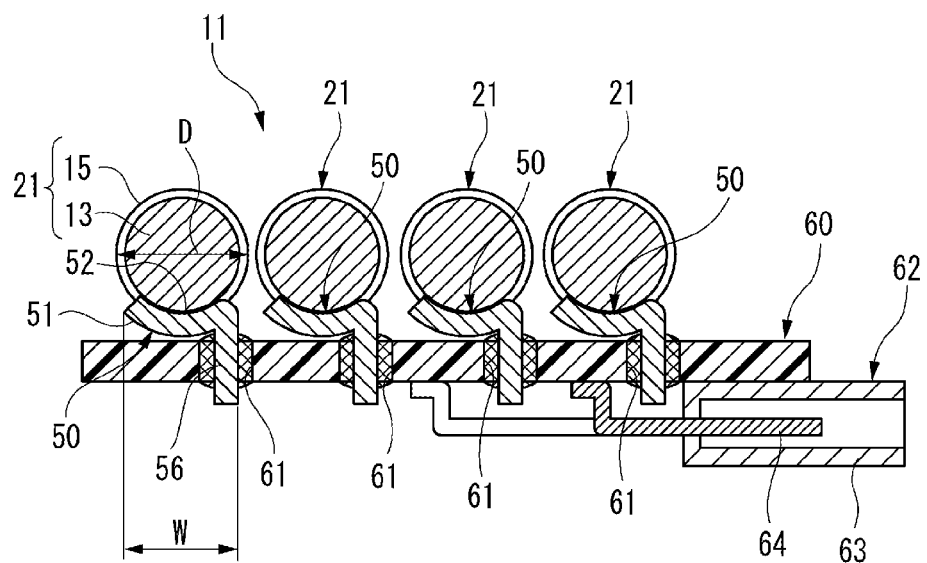
FIG. 4 is a cross-sectional view of a main part of a branching point in the branch box illustrated in FIG. 2.

FIG. 2 is a perspective view of the branch box 100A having a branch structure according to a first embodiment of the present invention. FIG. 3 is an exploded perspective view of the branch box 100A illustrated in FIG. 2. FIG. 4 is a cross-sectional view of a main part of the branching point in the branch box 100A illustrated in FIG. 2.

As illustrated in FIGS. 2 and 3, the branch box 100A having a branch structure according to the first embodiment of the present invention includes an accommodation case 30. The accommodation case 30 is made up of a lower case 31 and a cover 32. The lower case 31 and the cover 32 are each made of a synthetic resin having insulation properties.

The lower case 31 has a rectangular bottom surface plate portion 33 and a peripheral wall portion 34 formed on the peripheral edge of the bottom surface plate portion 33. The peripheral wall portion 34 has end surface plate portions 35 and side surface plate portions 36 which are arranged to face each other. In each end surface plate portion 35, a plurality (four, in this example) of trunk line insertion recesses 35a are formed at opposed positions. A connector accommodating recess 36a is formed in one of the side surface plate portions 36.

The cover 32 has a rectangular upper surface plate portion 38 and a peripheral wall portion 39 formed on the peripheral edge of the upper surface plate portion 38. The cover 32 is mounted to the lower case 31 from above, and is fixed by a locking mechanism (not illustrated). Consequently, the lower case 31 is covered with the cover 32 so that the peripheral wall portion 39 of the cover 32 covers the periphery of the upper portion of the peripheral wall portion 34.

As illustrated in FIGS. 2 to 4, the power supply system line 21 which is a plurality (four in this example) of trunk lines constituting the trunk-line harness 11 is inserted into the accommodation case 30. In addition, a plurality of connection terminals 50 are provided in the accommodation case 30. These connection terminals 50 have a connection plate portion 51, and a pin portion 56 extending downward is formed in the connection plate portion 51. In the connection terminal 50, one surface facing upward of the connection plate portion 51 is a joining surface 52 which comes into surface contact with the outer peripheral surface of the round rod conductor 13 in the power supply system line 21, and the joining surface 52 is joined to the outer peripheral surface of the round rod conductor 13 exposed by peeling off the insulating sheath 15. The respective connection terminals 50 are joined to the power supply system line 21 at a lower portion which is a position orthogonal to the arrangement direction.

Further, the outer peripheral surface of the round rod conductor 13 and the joining surface 52 in the power supply system line 21 are joined by, for example, soldering or ultrasonic joining. In the present embodiment, the round rod conductor 13 of the power supply system line 21 formed of a rod conductor is a round rod having a circular cross section. Accordingly, the connection plate portion 51 of the connection terminal 50 is formed in a circular arc shape which comes into surface contact with and close contact with the outer peripheral surface of the round rod conductor 13 formed of a round rod as seen from the axial direction of the power supply system line 21. Further, the width dimension W of the connection plate portion 51 of the connection terminal 50 is equal to or smaller than the diameter D (the width of the trunk line) of the power supply system line 21. As a result, the connection plate portion 51 of the connection terminal 50 is joined to the round rod conductor 13, without protruding in the arrangement direction of the power supply system line 21.

As illustrated in FIG. 3, a circuit board 60 made of a hard printed wiring board is provided in the accommodation case 30 along the arrangement direction of the power supply system line 21. In the circuit board 60, a through hole 61 into which the pin portion 56 of the connection terminal 50 is inserted is formed. The through hole 61 is formed in the circuit board 60 at the same pitch as the arrangement of the power supply system line 21. In the connection terminal 50, the pin portion 56 is inserted into the through hole 61, and is soldered and electrically connected to a conductor pattern (not illustrated) formed on the circuit board 60.

Further, a connector 62 is provided on one side edge portion of the circuit board 60. The connector 62 has a housing 63, and a plurality of tab terminals 64 are provided inside the housing 63. The tab terminal 64 of the connector 62 is electrically connected to the conductor pattern of the circuit board 60. The connector 62 is disposed in a connector accommodating recess 36a formed in the lower case 31 of the accommodation case 30, and a part of the housing 63 is exposed to the outside from the accommodation case 30.

The branch side connector 70 provided in the branch-line harness 12 is connected to the connector 62. A female terminal (not illustrated) connected to an end portion of the branch line 71 constituting the branch-line harness 12 is accommodated in the branch side connector 70. When the branch side connector 70 is connected to the connector 62, the female terminal provided in the branch side connector 70 is electrically connected to the tab terminal 64 of the connector 62. As a result, the branch line 71 constituting the branch-line harness 12 is electrically connected to the power supply system line 21 of the trunk-line harness 11 via the tab terminal 64, the conductor pattern of the circuit board 60 and the connection terminal 50.

As described above, according to the branch structure of the first embodiment using the above branch box 100A, the connection plate portion 51 of the connection terminal 50 for electrically connecting the branch line 71 to the power supply system line 21 has a width dimension W smaller than the diameter D of the power supply system line 21 having the round rod conductor 13 and is joined to the power supply system line 21 at a position orthogonal to the arrangement direction thereof. Therefore, the connection terminal 50 for connecting the branch line 71 to the power supply system line 21 does not protrude in the arrangement direction of the power supply system line 21. Therefore, the interval between the power supply system lines 21 can be reduced as much as possible, and the space for the branching points can be saved.

Further, since the connection plate portion 51 of the connection terminal 50 is joined to the outer peripheral surface of the round rod conductor 13 in the power supply system line 21 in a state of surface contact, a large contact area can be secured and high connection reliability can be secured.

In addition, since the connection terminal 50 joined to the power supply system line 21 and the branch line 71 are electrically connected to each other through the conductor pattern of the circuit board 60 arranged along the arrangement direction of the power supply system lines 21, the connection terminal 50 can be made common and the shape thereof can be simplified, and cost can be suppressed accordingly.

With the wire harness 10 having the branch structure according to the present embodiment, by the trunk-line harness 11 including the power supply system line 21 having the predetermined current capacity and routed in the vehicle body 1, and the branch-line harness 12 connecting the auxiliary machinery to the trunk-line harness 11 via the plurality of control boxes E1 to E5 distributed and arranged along the trunk-line harness 11, the wire harness 10 having a simple structure can be configured, and it is possible to provide the wire harness 10 in which the arrangement direction width of the trunk-line harness 11 is narrowed and the space saving at the connecting point to the branch-line harness 12 and the high connection reliability are obtained.

The trunk-line harness 11 in which the plurality of power supply system lines 21 are arranged in parallel is arranged to extend in the front-rear direction of the vehicle body 1 along the cabin floor substantially at the central portion in the left-right direction of the vehicle body 1. Therefore, if the interval between the power supply system lines 21 increases, the arrangement direction width of the trunk-line harness 11 expands and the occupied space increases. However, according to the branch structure of this embodiment, the arrangement direction width of the trunk-line harness 11 is minimized, and it is possible to provide the wire harness 10 in which the occupied space does not increase.

In the above embodiment, the case where the round rod conductor 13 is used as the routing member of the power supply system line 21 constituting the trunk-line harness 11 has been exemplified. However, the power supply system line 21 is not limited to the round rod conductor 13 as a rod conductor, and a rigid body having a polygonal cross section such as a square rod may be used. Even when the round rod conductor 13 rotates about its axis, it easily makes uniform surface contact with the connection plate portion 51 recessed in a circular arc shape, and it can be easily bent in all direction such as up, down, left, and right directions. Thus, it is preferably used as the power supply system line 21 constituting the trunk-line harness 11. When the routing member having a rod conductor formed of a rigid body having a polygonal cross section is used as the power supply system line 21, the joining surface 52 coming into surface-contact with the outer peripheral surface of the power supply system line 21 having a polygonal cross section may be used as the connection plate portion 51 of the connection terminal 50.

Further, the procedure of connecting each member in the branch box 100A according to the first embodiment is not particularly limited, after connecting the connection terminal 50 to the power supply system line 21, the connection terminals 50 may be connected to the circuit board 60, or after connecting the connection terminal 50 to the circuit board 60, the power supply system line 21 may be connected to the connection terminal 50.

Further, by mounting the cover 32 to the lower case 31 in the branch box 100A, the power supply system line 21 is pressed against the connection plate portion 51 of the connection terminal 50 so that the outer peripheral surface of the round rod conductor 13 in the power supply system line 21 and the joining surface 52 may be joined to each other.

Hereinafter, a branch structure according to another embodiment of the present invention will be described. The same components as those of the first embodiment are denoted by the same reference numerals, and description thereof will be omitted.

Second Embodiment

Figure 5:
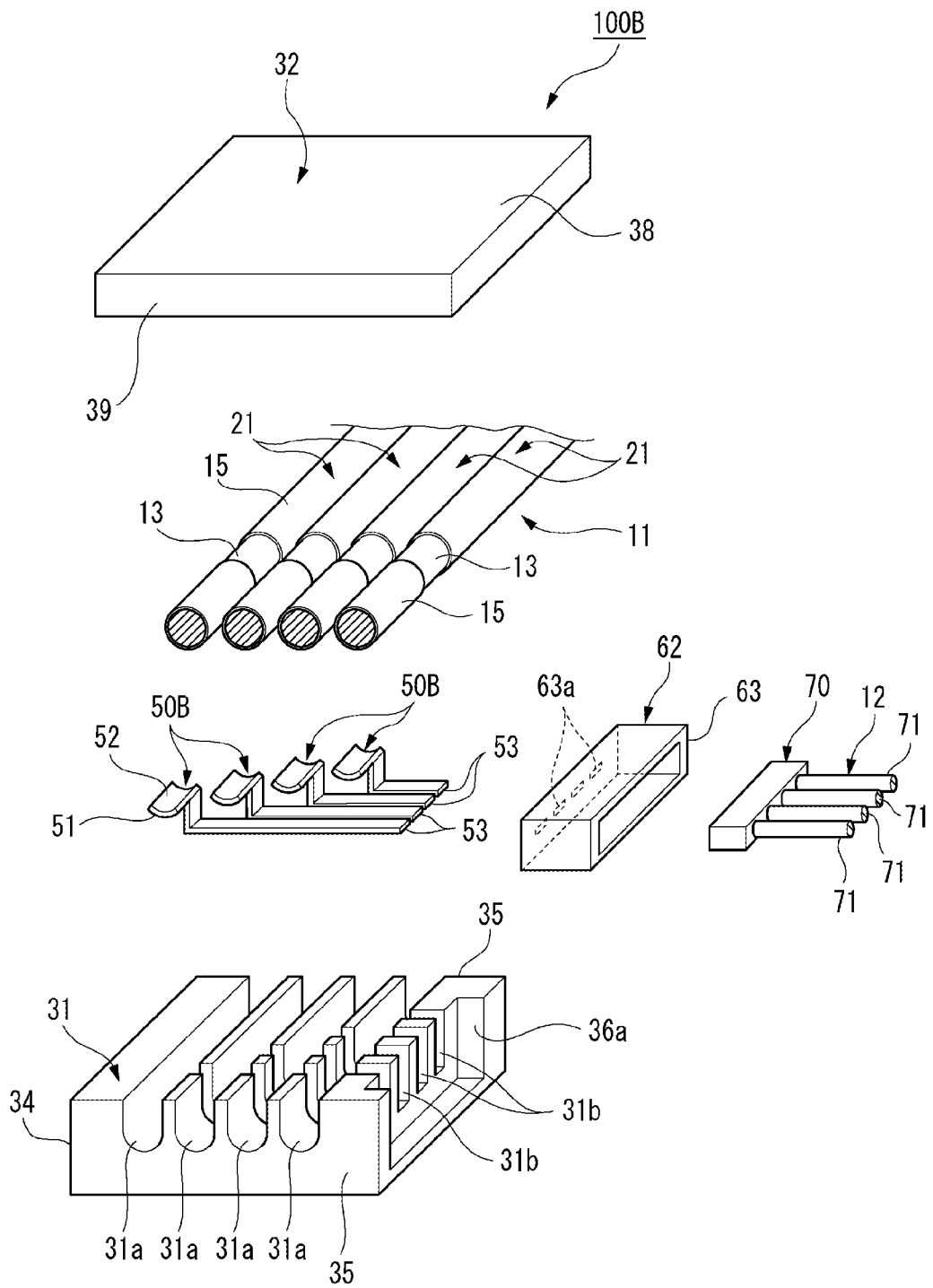
FIG. 5 is an exploded perspective view of a branch box having a branch structure according to a second embodiment of the present invention.

FIG. 5 is an exploded perspective view of a branch box 100B having a branch structure according to a second embodiment of the present invention.

As illustrated in FIG. 5, in the branch structure according to the second embodiment, the branch-line harness 12 is connected to the trunk-line harness 11 using the branch box 100B.

The branch box 100B does not include the circuit board 60 as in the branch box 100A, but includes a connection terminal 50B having a bus bar portion 53. The bus bar portion 53 extends downward from the connection plate portion 51 and further extends in the arrangement direction of the power supply system lines 21 orthogonal to the longitudinal direction of the trunk-line harness 11. The connection terminals 50B having the bus bar portions 53 with different lengths are connected to the round rod conductors 13 of the respective power supply system lines 21 according to the distance from the corresponding insertion holes 63a formed in the housing 63 of the connector 62. The end portion of the bus bar portion 53 of each connection terminal 50B is accommodated in the housing 63 as a tab terminal, through the insertion hole 63a of the connector 62.

Also, in the lower case 31 of the branch box 100B, a trunk line accommodating groove 31a and a bus bar portion accommodating groove 31b are formed. In the trunk line accommodating groove 31a, each power supply system line 21 of the trunk-line harness 11 is accommodated and held. In the bus bar portion accommodating groove 31b, the bus bar portion 53 of each connection terminal 50B connected to the power supply system line 21 is accommodated and held.

In the second embodiment, by connecting the branch side connector 70 of the branch-line harness 12 to the connector 62 of the branch box 100B, the branch line 71 constituting the branch-line harness 12 is electrically connected to the power supply system line 21 of the trunk-line harness 11 via the connection terminal 50B.

Also in the second embodiment, the connection terminals 50B for connecting the branch lines 71 to the power supply system line 21 do not protrude in the arrangement direction of the power supply system lines 21. Therefore, the interval between the power supply system lines 21 can be reduced as much as possible, the space for the branching points can be saved, and a large contact area can be secured and connection reliability can be enhanced.

In particular, in the second embodiment, since the circuit board 60 is not necessary by using the connection terminals 50B having the bus bar portion 53, it is possible to reduce the cost by reducing the number of components.

In the case of the second embodiment as well, as in the first embodiment, by mounting the cover 32 to the lower case 31, the power supply system line 21 may be pressed against the connection plate portion 51 of the connection terminal 50B to join the outer peripheral surface of the round rod conductor 13 in the power supply system line 21 and the joining surface 52 of the connection plate portion 51.

Third Embodiment

Figure 6:
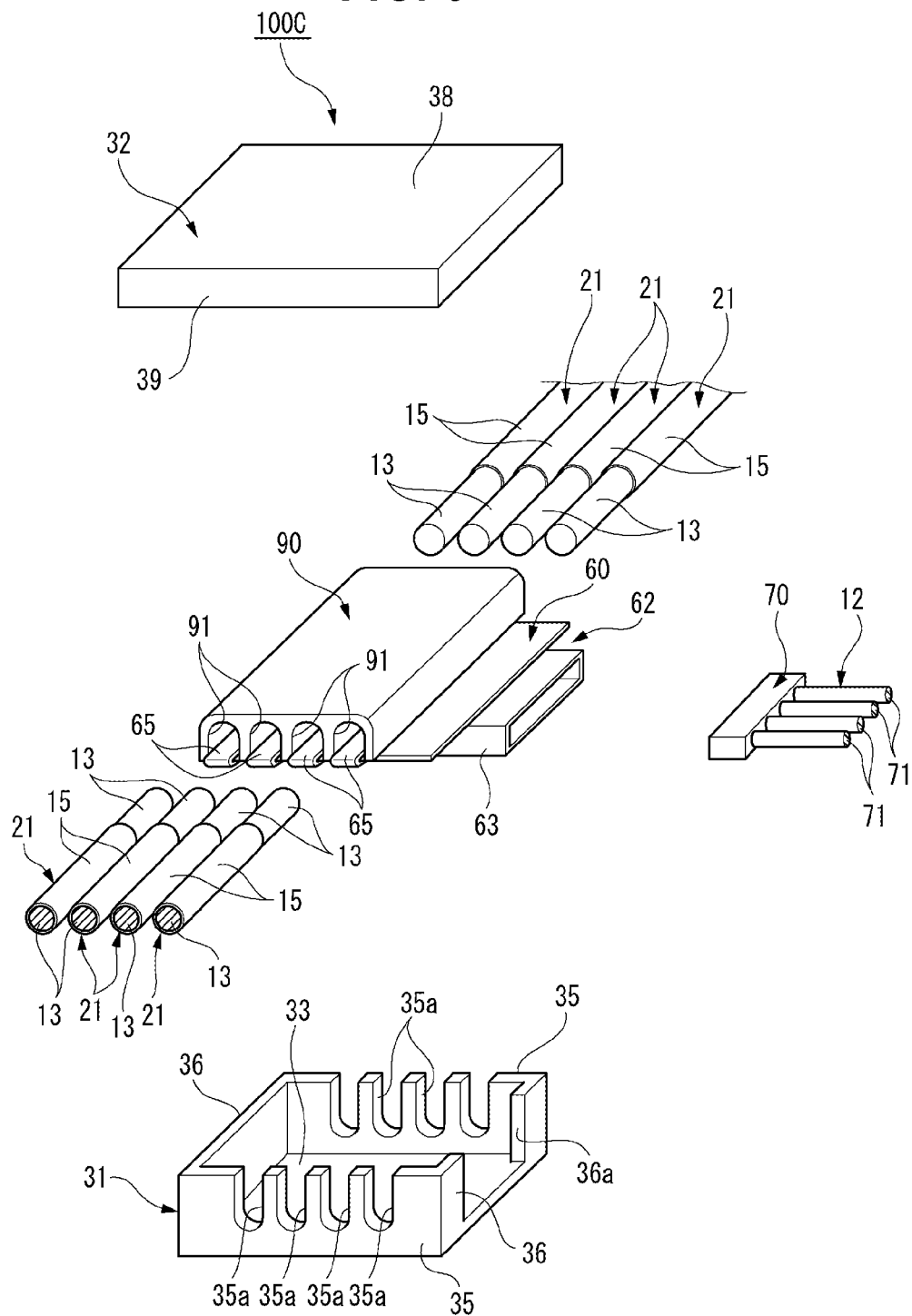
FIG. 6 is an exploded perspective view of a branch box having a branch structure according to a third embodiment of the present invention.
Figure 7:
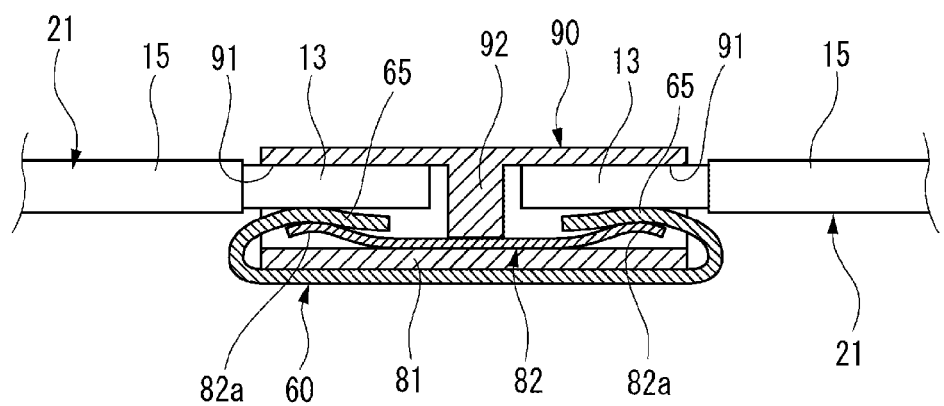
FIG. 7 is a cross-sectional view of a main part of a branching point in the branch box illustrated in FIG. 6.

FIG. 6 is an exploded perspective view of a branch box 100C having a branch structure according to a third embodiment of the present invention. FIG. 7 is a cross-sectional view of a main part of the branching point in the branch box 100C illustrated in FIG. 6. FIGS. 8A to 8C are views illustrating an assembly procedure of the branch box 100C illustrated in FIG. 6, and are perspective views in respective steps.

As illustrated in FIGS. 6 and 7, in the branch structure according to the third embodiment, the branch-line harness 12 is connected to the trunk-line harness 11, by using the branch box 100C not including the connection terminal 50 as in the branch box 100A described above. That is, the branch box 100C directly connects the power supply system line 21 of the trunk-line harness 11 and the circuit board 60. Further, in the third embodiment, the power supply system line 21 of the trunk-line harness 11 is divided.

In the third embodiment, a flexible wiring board which is a flexible board is used as the circuit board 60. Contact pieces 65 of the same number as the power supply system lines 21 are formed on both edge portions along the arrangement direction of the power supply system line 21 in the circuit board 60. The contact pieces 65 are formed in a strip shape and are formed in the arrangement direction of the power supply system lines 21 at the same pitch as the power supply system lines 21.

On the circuit board 60, a housing bottom plate 81 and an elastic member 82 are provided. The housing bottom plate 81 is a plate body made of a synthetic resin and having a rectangular shape in a plan view, and is attached to the lower surface side of the housing 90 in a state in which the elastic member 82 is interposed therebetween. The elastic member 82 is formed of a plate spring and is stacked on the upper surface side of the circuit board 60 via the housing bottom plate 81. On the elastic member 82, the same number of elastic pieces 82a as the power supply system lines 21 are formed on both edge portions along the arrangement direction of the power supply system line 21. These elastic pieces 82a are formed in the arrangement direction of the power supply system lines 21 at the same pitch as the power supply system line 21, and are curved to project upward.

The strip-like contact pieces 65 provided on the circuit board 60 are folded back to the upper surface side with respect to the circuit board 60. The contact pieces 65 are disposed so as to cover the elastic pieces 82a of the elastic member 82 stacked on the circuit board 60. A conductor pattern connected to the tab terminal 64 of the connector 62 extends to the contact piece 65 provided on the circuit board 60. Further, on the circuit board 60, conductor patterns connecting the opposed contact pieces 65 are formed. The respective end portions of the divided power supply system line 21 are arranged above the folded contact pieces 65. A part of the solder resist is peeled off from the contact piece 65, and a conductor exposed portion 65a in which a part of the conductor pattern is exposed is provided (see FIG. 8B).

A housing 90 made of a synthetic resin is provided on the upper portion of the circuit board 60. In the housing 90, a trunk line introduction groove 91 is formed along the front-rear direction of the trunk-line harness 11 on the lower surface side facing the circuit board 60. The trunk line introduction grooves 91 are formed in the arrangement direction of the power supply system lines 21 at the same pitch as the power supply system line 21. In addition, in the housing 90, a partition wall portion 92 is formed in the central portion in the longitudinal direction of the trunk-line harness 11 on the lower surface side.

The housing 90 is disposed so as to cover the upper surface side of the circuit board 60. When the housing 90 covers the upper surface of the circuit board 60, the contact pieces 65 arranged to cover the elastic pieces 82a of the circuit board 60 are arranged in the trunk line introduction grooves 91. The end portions of the divided power supply system line 21 are inserted into the trunk line introduction grooves 91.

In order to assemble the housing bottom plate 81, the elastic member 82 and the housing 90 to the circuit board 60, as illustrated in FIG. 8A, the circuit board 60 in a state in which the contact piece 65 extends is prepared, and as illustrated in FIG. 8B, the housing bottom plate 81 and the elastic member 82 are stacked in order on the circuit board 60. Further, the contact pieces 65 extending from both edges of the circuit board 60 are folded back to the upper surface side of the circuit board 60 and arranged to cover the elastic pieces 82a of the elastic member 82.

Further, as illustrated in FIG. 8C, the housing 90 covers the upper surface side of the circuit board 60 and is fixed to the housing bottom plate 81, and the contact pieces 65 of the circuit board 60 arranged to cover the elastic pieces 82a are disposed in the trunk line introduction grooves 91.

Thereafter, the assembly including the circuit board 60, the housing bottom plate 81, the elastic member 82, and the housing 90 is accommodated in the lower case 31, and the lower case 31 is covered and mounted with the cover 32.

In the branch box 100C assembled in this manner, the end portion of the power supply system line 21 in which the insulating sheath 15 is peeled off and the round rod conductor 13 is exposed, is insert into the trunk line introduction groove 91 of the housing 90 communicating with the trunk line insertion recess 35a of the lower case 31. Then, the conductor exposed portion 65a of the contact piece 65 disposed in the trunk line introduction groove 91 is pressed against the round rod conductor 13 of the power supply system line 21 by the elastic force of the elastic piece 82a, and the conductor pattern of the circuit board 60 comes into contact with the round rod conductor 13. As a result, the conductor patterns of the circuit board 60 connected to the respective tab terminals 64 are electrically connected to the power supply system lines 21, and the power supply system lines 21 inserted in the trunk line introduction grooves 91 at the opposing positions are electrically connected to each other by the conductor pattern.

In the third embodiment, by connecting the branch side connector 70 of the branch-line harness 12 to the connector 62 of the branch box 100C, the branch line 71 constituting the branch-line harness 12 is electrically connected to the divided power supply system line 21 of the trunk-line harness 11 via the conductor pattern of the circuit board 60. Further, in the third embodiment, the divided power supply system lines 21 are electrically connected to each other by the conductor pattern of the circuit board 60.

In this way, according to the third embodiment, it is easy to electrically connect the power supply system line 21 and the branch line 71 by inserting the end portion of the power supply system line 21 into the trunk line introduction groove 91. Further, parts such as a bus bar and a terminal for electrically connecting the power supply system line 21 and the branch line 71 can be made unnecessary, and the cost can be suppressed by reducing the number of components.

Particularly, according to the third embodiment, since the divided power supply system lines 21 are electrically connected to each other by the conductor pattern of the circuit board 60, the direction of the trunk line introduction groove 91 is changed to adjust the connection direction of the power supply system line 21. Thus, it is possible to make an angle at the connection point of the divided power supply system lines 21. As a result, the routing path of the trunk-line harness 11 can be bent as necessary, and the degree of freedom of routing can be increased. Further, in the insertion point of the power supply system line 21 to the trunk line introduction grooves 91, the routing can be performed, while absorbing the variation in the length of the routing path of the trunk-line harness 11, which makes it possible to improve the routing workability.

Further, in the third embodiment, the case where the flexible wiring board is used as the circuit board 60 has been described as an example, but a hard board may be used as the circuit board 60. In this case, flexible strip-like contact pieces 65 are provided at both edge portions of the circuit board 60 made of a hard board.

In some cases, it may be necessary for the wire harness 10 to bend the routing path of the trunk-line harness 11 according to the shape of the vehicle body 1 or the like. Therefore, in the case of bending the routing path of such a trunk-line harness 11, by using the branch box 100C, the routing path of the trunk-line harness 11 can be easily bent.

Here, a wire harness 10A in which the routing path of the trunk-line harness 11 is bent will be described.

Figure 9:
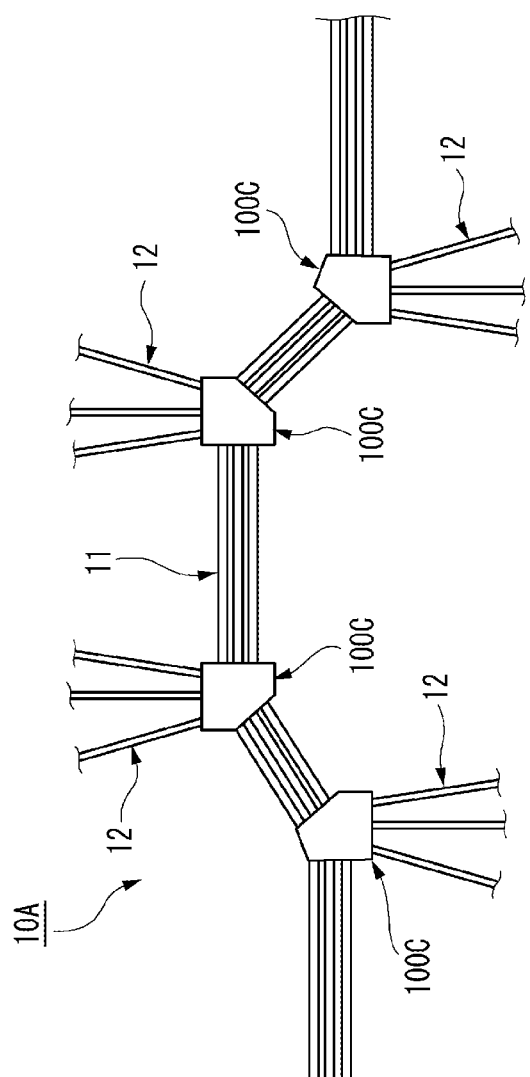
FIG. 9 is a plan view of a wire harness illustrating a wire harness having a bent portion in a routing path.

FIG. 9 is a plan view of the wire harness illustrating the wire harness 10A having the bent portion in the routing path.

As illustrated in FIG. 9, in the wire harness 10A, a routing path of the trunk-line harness 11 is bent at a branching point of the branch-line harness 12 with respect to the trunk-line harness 11. In such a wire harnesses 10A, the connecting point between the trunk-line harness 11 and the branch-line harness 12, the branch box 100C capable of bending the routing direction of the trunk-line harness 11 is provided.

That is, in the wire harness 10A the branch-line harness 12 is electrically connected to the trunk-line harness 11 by the branch box 100C, the branch-line harness 12 is branched from the trunk-line harness 11, and the routing path of the trunk-line harness 11 is further bent.

Fourth Embodiment

Figure 10:
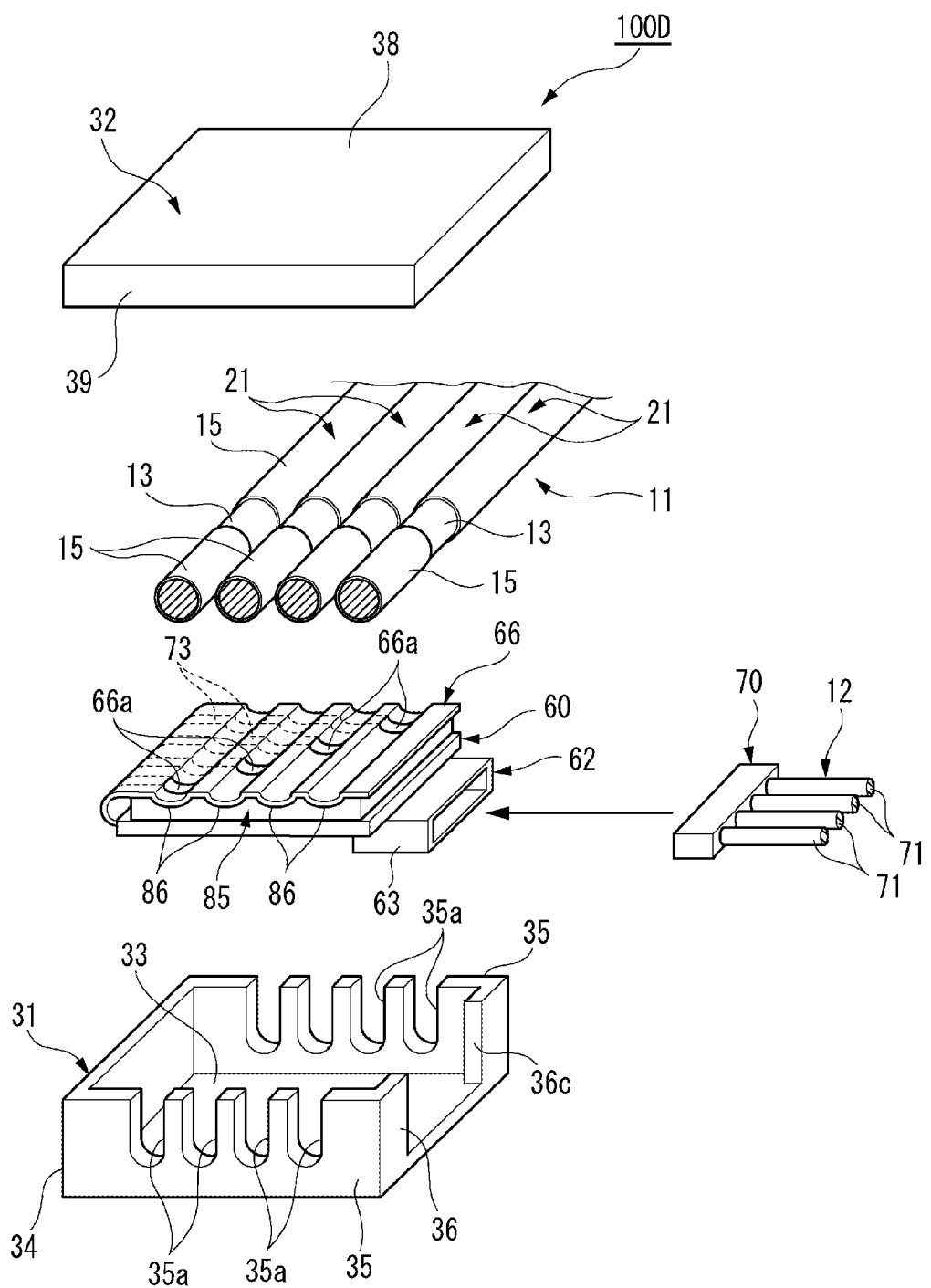
FIG. 10 is an exploded perspective view of a branch box having a branch structure according to a fourth embodiment of the present invention.
Figure 11A:
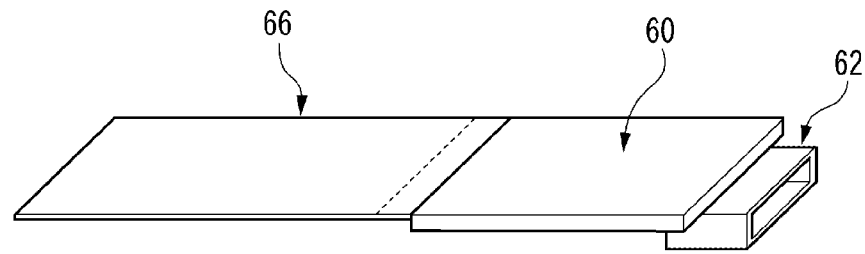
FIGS. 11A to 11C are views illustrating an assembly procedure of the branch box illustrated in FIG. 10, and are perspective views in respective processes.
Figure 11B:
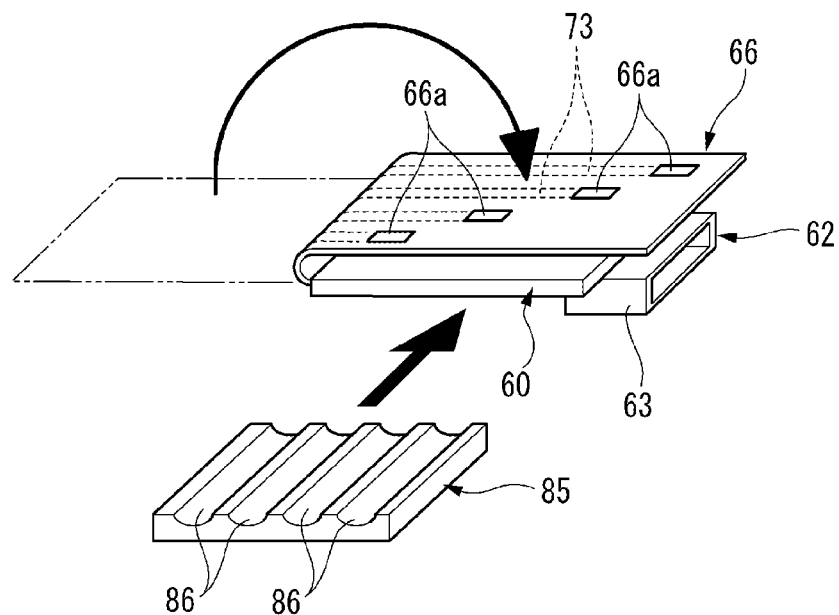
Figure 11C:
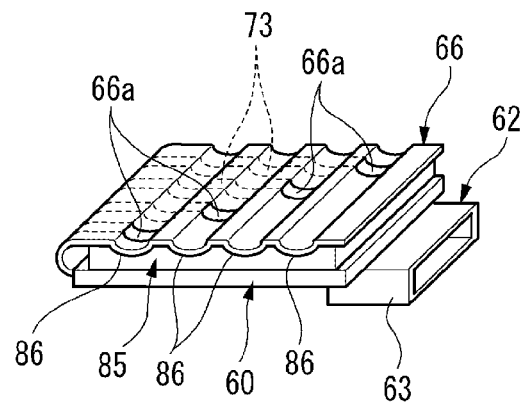

FIG. 10 is an exploded perspective view of a branch box 100D having a branch structure according to a fourth embodiment of the present invention. FIGS. 11A to 11C are views illustrating an assembling procedure of the branch box 100D illustrated in FIG. 10, and are perspective views in respective steps.

As illustrated in FIG. 10, in the branch structure according to the fourth embodiment, the branch-line harness 12 is connected to the trunk-line harness 11 using the branch box 100D.

The circuit board 60 is provided with a flexible board portion 66 at an edge portion on the side opposite to the connector 62. The flexible board portion 66 is a flexible board such as a flexible wiring board, and is folded back with respect to the circuit board 60 and arranged on the upper surface side of the circuit board. A conductor pattern 73 connected to the tab terminal 64 of the connector 62 extends on the flexible board portion 66 provided on the circuit board 60.

A spacer 85 is stacked on the upper surface side of the circuit board 60, and the flexible board portion 66 folded back to the upper surface side of the circuit board 60 is stacked on the upper surface side of the spacer 85. The spacer 85 is made of a synthetic resin, and a holding groove 86 along the longitudinal direction of the trunk-line harness 11 is formed on the upper surface side on which the flexible board portion 66 is stacked. The holding grooves 86 are formed by the same number as that of the power supply system line 21, and are formed at the position aligned in the arrangement direction of the power supply system line 21 at the same pitch as the power supply system line 21 to correspond to the power supply system line 21 of the trunk-line harness 11. The holding groove 86 has a shape conforming to the outer shape of the power supply system line 21. Specifically, the holding groove 86 has a shape recessed in a circular arc shape in cross section in conformity with the round rod conductor 13 in the power supply system line 21.

The flexible board portion 66 of the circuit board 60 stacked on the upper surface side of the spacer 85 has a shape along the upper surface of the spacer 85 having the holding groove 86. A power supply system line 21 of the trunk-line harness 11 is disposed at a position corresponding to the holding groove 86 of the spacer 85 on the upper portion of the flexible board portion 66. Further, in the flexible board portion 66, a part of the solder resist is peeled off at the portion in which the respective power supply system lines 21 are arranged. Consequently, a conductor exposed portion 66a, in which a part of the conductor pattern 73 extending from the tab terminal 64 is exposed, is provided in a portion on which the power supply system line 21 is disposed, in a portion from which the solder resist is peeled off. The round rod conductor 13 exposed by peeling the insulating sheath 15 in each of the power supply system lines 21 is joined to the conductor pattern 73 exposed at the conductor exposed portion 66a by, for example, soldering or ultrasonic joining.

In order to assemble the spacer 85 to the circuit board 60, as illustrated in FIG. 11A the circuit board 60 before folding the flexible board 66 is prepared, and as illustrated in FIG. 11B, the flexible board portion 66 is folded back to the upper surface side of the circuit board 60 and a spacer 85 with the holding groove 86 facing upward is inserted between the circuit board 60 and the flexible board portion 66.

Then, as illustrated in FIG. 11C the spacer 85 is disposed between the circuit board 60 and the flexible board portion 66, and the flexible board portion 66 on the upper surface side of the spacer 85 has a shape along the upper surface of the spacer 85 having the holding groove 86.

Thereafter, the power supply system line 21 is placed at a position corresponding to the holding groove 86 of the spacer 85 on the upper surface side of the flexible board portion 66 of the circuit board 60, and the conductor pattern 73 exposed at the conductor exposed portion 66a of the flexible board portion 66 and the round rod conductor 13 of the power supply system line 21 are joined to each other. As a result, the power supply system line 21 is electrically connected to the conductor pattern 73 of the circuit board 60 connected to the tab terminal 64.

In the fourth embodiment, by connecting the branch side connector 70 of the branch-line harness 12 to the connector 62 of the branch box 100D, the branch line 71 constituting the branch-line harness 12 is electrically connected to the power supply system line 21 of the trunk-line harness 11 via the conductor pattern 73 of the circuit board 60 having the flexible board portion 66.

As described above, according to the fourth embodiment, the power supply system line 21 is fitted into the recess of the flexible board portion 66 formed by the holding groove 86 of the spacer 85, and by joining the round rod conductor 13 of the power supply system line 21 and the conductor pattern 73 exposed at the conductor exposed portion 66a, the power supply system line 21 and the branch line 71 can easily be electrically connected to each other. In addition, parts such as a bus bar and a terminal for electrically connecting the power supply system line 21 and the branch line 71 can be made unnecessary, and the cost can be suppressed by reducing the number of components.

In the fourth embodiment, the entire circuit board 60 including the flexible board portion 66 may be a flexible wiring board.

Further, after the spacer 85 is disposed between the circuit board 60 and the flexible board part 66, the power supply system lines 21 are pressed against the upper surface side of the flexible board portion 66 at the position corresponding to the holding groove 86 of the spacer 85 in order from the folding back side, and it is possible to join the round rod conductor 13 and the conductor exposed portion 66a, while forming the flexible board portion 66 into a shape conforming to the upper surface of the spacer 85 having the holding groove 86.

Fifth Embodiment

Figure 12:
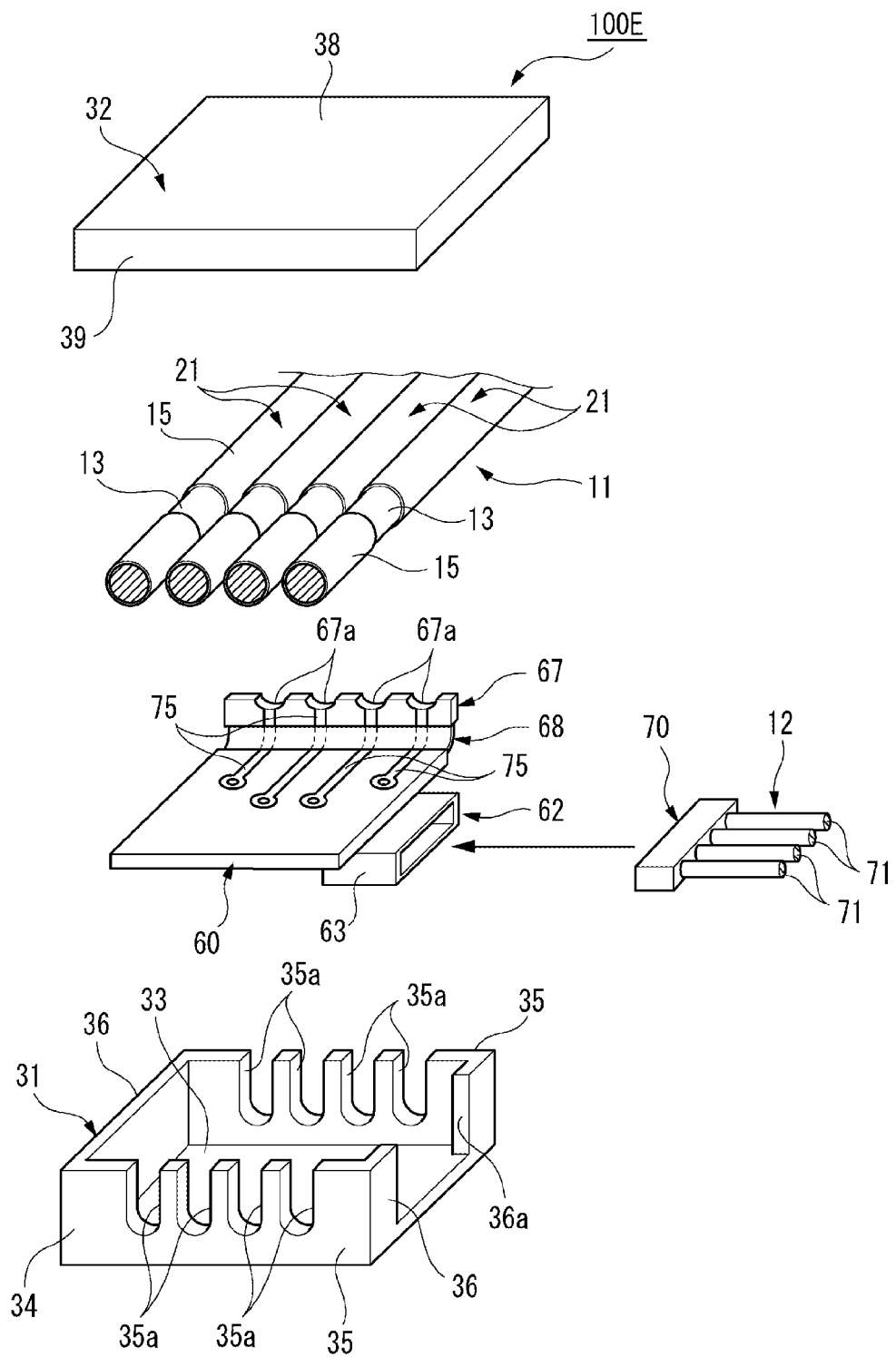
FIG. 12 is an exploded perspective view of a branch box having a branch structure according to a fifth embodiment of the present invention.

FIG. 12 is an exploded perspective view of a branch box 100E having a branch structure according to a fifth embodiment of the present invention.

As illustrated in FIG. 12, in the branch structure according to the fifth embodiment, the branch-line harness 12 is connected to the trunk-line harness 11 using the branch box 100E.

In the fifth embodiment, the circuit board 60 is provided with a connection board portion 67. The connection board portion 67 is connected to one edge along the arrangement direction of the power supply system line 21 in the circuit board 60 by a flexible portion 68 formed of a flexible wiring board or the like. By bending the flexible portion 68, the end edge portion of the connection board portion 67 faces the upper part which is the power supply system line 21 side, and by accommodating the circuit board 60 in the lower case 31, the connection board portion 67 is pressed and biased by the end surface plate portion 35 of the lower case 31 and is maintained in a posture in which the end edge portion is directed upward.

A holding recess 67a is formed at the end edge portion of the connection board portion 67. The number of the holding recesses 67a is the same as the number of the power supply system lines 21 and is formed at the position aligned with the arrangement direction of the power supply system lines 21 at the same pitch as the power supply system line 21 to correspond to each power supply system line 21 of the trunk-line harness 11. The holding recess 67a has a shape conforming to the outer shape of the round rod conductor 13 in the power supply system line 21. Specifically, the holding recess 67a has a shape recessed in a circular arc shape in conformity with the outer peripheral surface of the round rod conductor 13 of the power supply system line 21.

A conductor pattern 75 formed on the circuit board 60 and connected to the tab terminal 64 is guided via the flexible portion 68 on the inner surface of the holding recess 67a of the connection board portion 67. A round rod conductor 13 exposed by peeling the insulating sheath 15 in the power supply system line 21 is fitted into the holding recess 67a. The round rod conductor 13 in each power supply system line 21 is joined to the conductor pattern 75 guided to the inner surface of the holding recess 67a of the circuit board 60 by, for example, soldering or ultrasonic joining. As a result, the conductor pattern 75 of the circuit board 60 connected to the each tab terminal 64 is electrically connected to each power supply system line 21.

In the fifth embodiment, by connecting the branch side connector 70 of the branch-line harness 12 to the connector 62 of the branch box 100E, the branch line 71 constituting the branch-line harness 12 is electrically connected to the power supply system line 21 of the trunk-line harness 11 via the conductor pattern 75 of the circuit board 60 having the connection board portion 67.

As described above, according to the fifth embodiment, by making the power supply system line 21 conductive to the conductor pattern 75 guided to the inner surface of the holding recess 67a of the connection board portion 67 of the circuit board 60, the power supply system line 21 and the branch line 71 can easily be electrically connected to each other. In addition, parts such as a bus bar and a terminal for electrically connecting the power supply system line 21 and the branch line 71 can be made unnecessary, and the cost can be suppressed by reducing the number of components.

In the fifth embodiment, the connection board portions 67 are provided on both edge portions of the circuit board 60, and the respective end portions of the power supply system lines 21 divided by the holding recesses 67a of the respective connection board portions 67 may be joined each other. With such a structure, it is possible to make an angle at the connection point of the divided power supply system lines 21. As a result, the routing path of the trunk-line harness 11 can be bent as necessary, and the degree of freedom of wiring can be increased.

It is to be noted that the present invention is not limited to the above-described embodiment, but can be appropriately modified, improved, and the like. In addition, the materials, shapes, dimensions, numbers, arrangement locations, and the like of the constituent elements in the above-described embodiments are arbitrary as far as the present invention can be achieved, and are not limited.

For example, at the time of connection with the branch line 71, the power supply system line 21 may remove the insulating sheath 15 provided in advance to expose the round rod conductor 13 at the connecting point, and the insulating sheath 15 may be provided in a subsequent step in other portions except the connecting point.

Here, the features of the embodiment of the branch structure and the wire harness according to the present invention described above are briefly summarized below in the following [1] to [4], respectively [1] A branch structure in which a branch-line harness (12) having a plurality of branch lines (71) are connected to a trunk-line harness (11) in which a plurality of trunk lines (power supply system line 21) including a routing member having a rod conductor (round rod conductor 13), wherein a connection terminal (50, 50B) electrically connecting the branch line to the trunk line by being joined to the trunk line includes a connection plate portion (51) which has a width dimension (W) smaller than the width (diameter D) of the trunk line, and is joined in a state of being in surface contact with an outer peripheral surface of the rod conductor in the trunk line, and the connection plate portion is joined to the trunk line at a position orthogonal to an arrangement direction of the trunk lines.

In the branch structure set forth in [1], the connection terminal (50) is mounted on a circuit board (60) arranged in the arrangement direction of the trunk line (the power supply system line 21), and the connection terminal and the branch line (71) are electrically connected to each other, by joining a connector (branch side connector 70) on the side of the branch-line harness (12) to a connector (62) provided on the circuit board.

[3] In the branch structure set forth in [1], the connection terminal (50B) has a bus bar portion (53) which extends along the arrangement direction of the trunk line (power supply system line 21) from the connection plate portion (51), and the connection terminal and the branch line (71) are electrically connected to each other, by joining a connector (branch side connector 70) on the side of the branch-line harness (12) to a connector (62) provided at an end portion of the bus bar portion (53).

[4] A wire harness (10) which includes a trunk-line harness (11) routed on a vehicle body (1) having at least a power supply system line (21) having a predetermined current capacity;

a branch-line harness (12) connected to an auxiliary machinery of a vehicle; and a plurality of control boxes (E1 to E5) which have a control unit for distributing power of the power supply system line supplied to the trunk-line harness to the branch-line harness connected to the trunk-line harness, and is distributed and arranged along the trunk-line harness, wherein the control box connects the branch-line harness to the trunk-line harness with the branch structure according to any one of [1] to [3].

What is claimed is:

1. A branch structure comprising:
a trunk-line harness in which a plurality of trunk lines including a routing member having a rod conductor are disposed in parallel;
a branch-line harness that has a plurality of branch lines; and
a connection terminal that electrically connects a branch line of the plurality of branch lines to a trunk line of the plurality of the trunk lines by being joined to the trunk line,
wherein the connection terminal includes a connection plate portion which has a width dimension in an arrangement direction of the plurality of trunk lines smaller than the width of the trunk line in the arrangement direction, and a contact surface of the connection plate portion is joined in a state of being in surface contact with an outer peripheral surface of the rod conductor in the trunk line,
wherein the contact surface of the connection plate portion extends in the arrangement direction, and
wherein the connection plate portion is joined to the trunk line at a position where the connection plate portion is orthogonal to the arrangement direction of the plurality of trunk lines.

2. The branch structure according to claim 1, wherein the connection terminal is mounted on a circuit board which is disposed along the arrangement direction of the plurality of trunk lines, and
the connection terminal and the branch line are electrically connected to each other, by joining a connector of the branch-line harness to a connector provided on the circuit board.

3. The branch structure according to claim 1, wherein the connection terminal has a bus bar portion which extends along the arrangement direction of the plurality of trunk lines from the connection plate portion, and the connection terminal and the branch line are electrically connected to each other, by joining a connector of the branch-line harness to a connector provided at an end portion of the bus bar portion.

4. A wire harness comprising:
a plurality of control boxes; and
the branch structure according to claim 1,
wherein the trunk-line harness is routed on a vehicle body and includes at least a power supply system line having a predetermined current capacity,
wherein the branch-line harness is connected to an auxiliary machinery of a vehicle,
wherein the plurality of control boxes have a control unit for distributing power of the power supply system line supplied to the trunk-line harness to the branch-line harness connected to the trunk-line harness, and are distributed and arranged along the trunk-line harness, and
wherein a control box of the plurality of control boxes connects the branch-line harness to the trunk-line harness with the branch structure.

* * * * *